US009517802B1

(12) United States Patent
Froling et al.

(10) Patent No.: US 9,517,802 B1
(45) Date of Patent: Dec. 13, 2016

(54) ACTIVE UNDERBODY DEFLECTOR

(71) Applicant: GM GLOBAL TECHNOLOGY OPERATIONS LLC, Detroit, MI (US)

(72) Inventors: Thomas H. Froling, Beverly Hills, CA (US); Timothy J. Herrick, Rochester Hills, MI (US); Joseph Hanna, Royal Oak, MI (US); Titus H. Sgro, Beverly Hills, CA (US); Changyoung Heo, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/845,938

(22) Filed: Sep. 4, 2015

(51) Int. Cl.
*B62D 35/00* (2006.01)
*B62D 35/02* (2006.01)

(52) U.S. Cl.
CPC ............ *B62D 35/005* (2013.01); *B62D 35/02* (2013.01)

(58) Field of Classification Search
CPC ............................. B62D 35/02; B62D 35/005
USPC ..................... 296/180.1–180.5; 293/120–122
See application file for complete search history.

(56) References Cited

U.S. PATENT DOCUMENTS

| 4,131,308 | A | * | 12/1978 | Holka ................. B62D 35/005 296/180.5 |
| 4,159,140 | A | | 6/1979 | Chabot et al. |
| 4,486,046 | A | | 12/1984 | Whitney et al. |
| 4,659,130 | A | * | 4/1987 | Dimora ................. B62D 35/005 293/118 |
| 4,683,974 | A | | 8/1987 | Richardson |
| 6,079,769 | A | | 6/2000 | Fannin et al. |
| 6,513,843 | B1 | | 2/2003 | Frederick et al. |
| 6,874,842 | B2 | | 4/2005 | Hojna |
| 6,886,883 | B2 | * | 5/2005 | Jacquemard ......... B62D 35/005 180/903 |
| 7,775,582 | B2 | | 8/2010 | Browne et al. |
| 8,677,817 | B2 | | 3/2014 | Li et al. |
| 8,807,629 | B2 | | 8/2014 | Benvenuto et al. |
| 9,102,366 | B1 | * | 8/2015 | Kim ...................... B62D 35/005 |
| 2011/0049913 | A1 | * | 3/2011 | Bernt ...................... B60R 19/48 293/102 |
| 2013/0341110 | A1 | | 12/2013 | Butlin, Jr. |
| 2014/0076645 | A1 | | 3/2014 | McDonald et al. |
| 2014/0265435 | A1 | | 9/2014 | Smith |

* cited by examiner

*Primary Examiner* — Dennis H Pedder
(74) *Attorney, Agent, or Firm* — Quinn Law Group, PLLC

(57) ABSTRACT

An active aerodynamic feature for an underside of a vehicle includes a static panel and a dynamic panel. The static panel has a leading edge attached to a front fascia of the vehicle, and a trailing edge distal from the front fascia. The dynamic panel is movably attached to the trailing edge of the static panel. An actuator is configured to locate the dynamic panel in at least two fixed positions relative to the static panel. The fixed positions include a stowed position, which is substantially aligned with the trailing edge of the static panel, and a deployed position, which is at an offset angle relative to the trailing edge of the static panel and also to the stowed position.

10 Claims, 3 Drawing Sheets

ACTIVE UNDERBODY DEFLECTOR

TECHNICAL FIELD

This disclosure generally relates to aerodynamic features for vehicles.

BACKGROUND

Many vehicles—from industrial, to heavy duty, to military, to light duty passenger—include aerodynamic and styling panels or structures to direct airflow around the vehicle.

SUMMARY

An active aerodynamic feature for a vehicle is provided. The active aerodynamic feature is located on an underside of the vehicle and includes a static panel and a dynamic panel.

The static panel has a leading edge attached to a front fascia of the vehicle, and a trailing edge distal from the front fascia. The dynamic panel is movably attached to the trailing edge of the static panel.

An actuator is configured to locate the dynamic panel in at least two fixed positions relative to the static panel. The fixed positions include a stowed position, which is substantially aligned with the trailing edge of the static panel, and a deployed position, which is at an offset angle relative to the trailing edge of the static panel and also to the stowed position.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
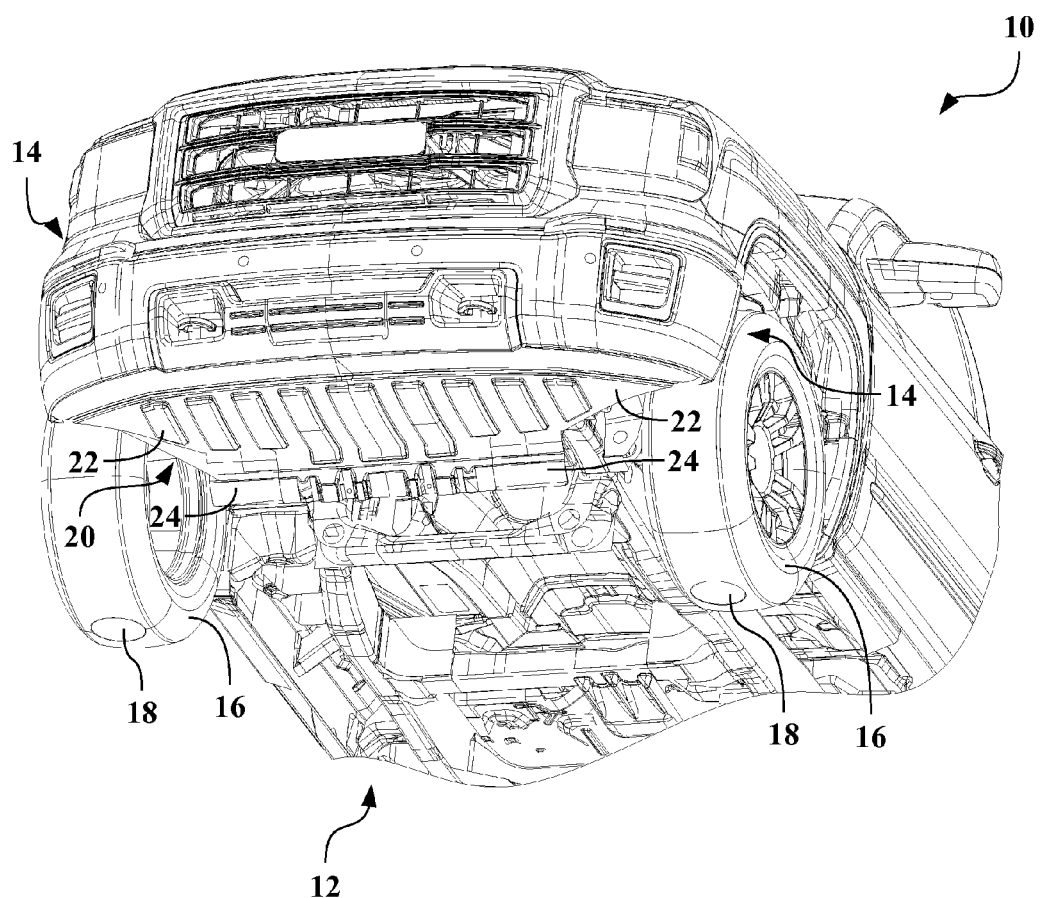
FIG. 1 is a schematic, isometric view of a vehicle underside equipped with an active closeout panel or underbody deflector.

Referring to the drawings, like reference numbers correspond to like or similar components whenever possible throughout the several figures. FIG. 1 broadly illustrates a vehicle 10 viewed schematically from an underside 12 thereof. The example vehicle 10 shown includes many aerodynamic, styling, and structural features, but may not illustrate all features of the vehicle 10. A front fascia 14 includes a grill, a front bumper, head and parking lamps, and other forward-facing components.

FIG. 1 illustrates the front wheels 16 in contact with a road surface or ground plane 18. In general, the ground plane may be defined by the orientation of a flat road surface during steady state operation of the vehicle 10.

The underside 12 of the vehicle 10 also includes an active aerodynamic feature or active underbody deflector 20, which selectively varies or controls the airflow moving from the front to the rear of the vehicle between the underside 12 and ground plane 18.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 2A:
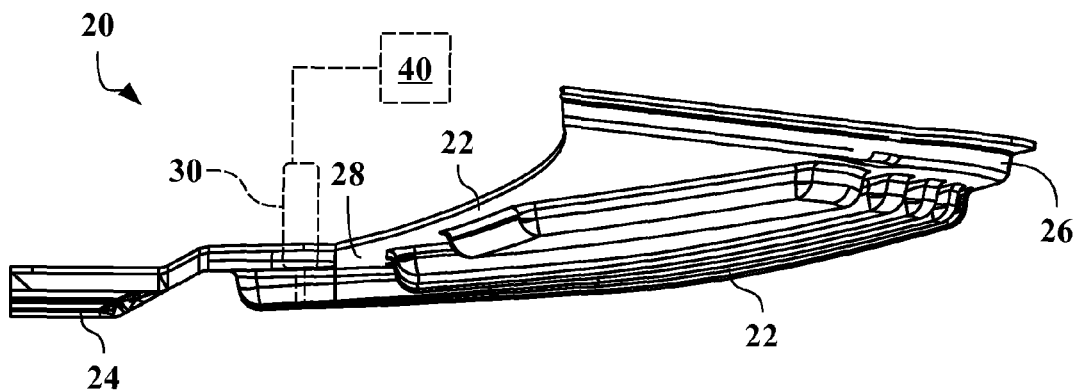
FIG. 2A is a schematic, side view of an active underbody deflector illustrated in a stowed position.
Figure 2B:
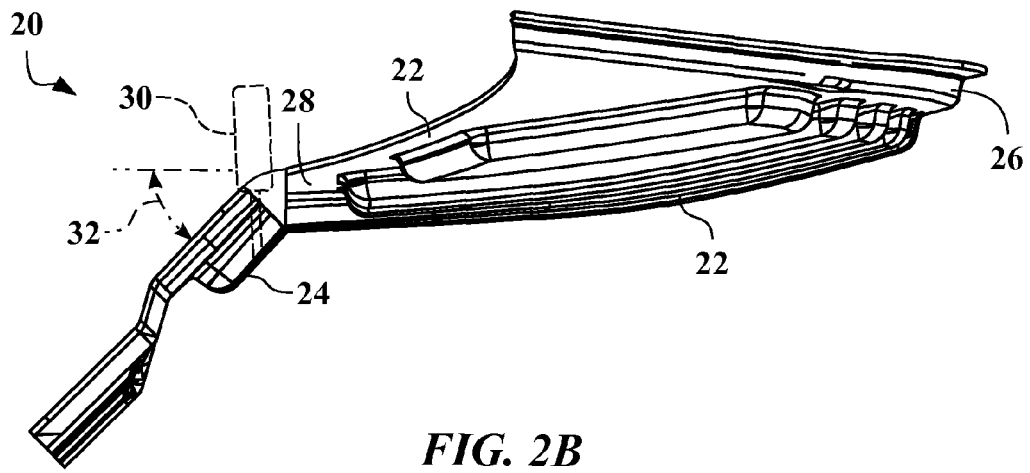
FIG. 2B is a schematic, side view of the active underbody deflector illustrated in a partially deployed position.
Figure 2C:
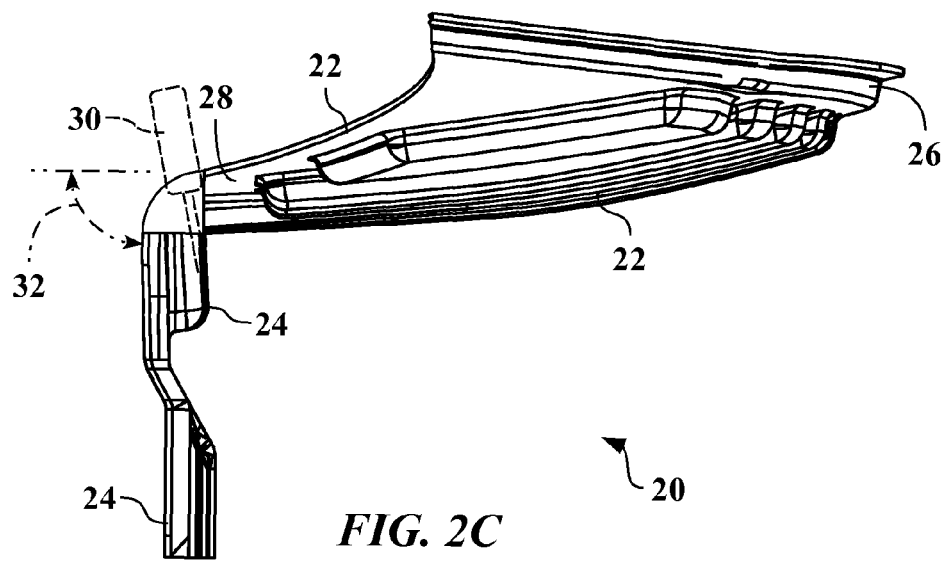
FIG. 2C is a schematic, side view of the active underbody deflector illustrated in a fully deployed position.

Referring also to FIGS. 2A, 2B, and 2C, and with continued reference to FIG. 1, there are shown additional views of the active underbody deflector 20. As shown in the figures, the active underbody deflector 20 may be selectively positioned to vary the flow path of air moving toward the mid and rear section of the underside 12. FIG. 2A shows a schematic side view of the active underbody deflector 20 in a stowed position; FIG. 2B shows a schematic side view of the active underbody deflector 20 in a partially deployed position; and FIG. 2C shows a schematic side view of the active underbody deflector 20 in a fully deployed position. The partially deployed position illustrated in FIG. 2B generally corresponds to that illustrated in FIG. 1.

The active underbody deflector 20 includes a static panel 22, which may also be referred to as a closeout panel, and a dynamic panel 24, which is movably attached to the static panel 22. The example static panel 22 shown includes an elevation drop and aerodynamic shaping to improve airflow at the front of the vehicle 10. The static panel 22 has a leading edge 26 attached to a front fascia 14 of the vehicle 10 and a trailing edge 28 distal from the front fascia 14. The leading edge 26 and the trailing edge 28 are generally defined relative to airflow moving from the front fascia 14 toward the rear (not shown) of the vehicle 10. The leading edge 26 and the trailing edge 28 also generally refer to the bottom portions or surfaces of the static panel 22—i.e., those areas that are in contact with airflow, as opposed to those areas opposite from the ground plane 18.

The dynamic panel 24 is movably attached to the trailing edge 28 of the static panel 22. In many configurations, such as that shown, the dynamic panel may rotate about an axis adjacent to the trailing edge 28. The dynamic panel 24 may be disposed behind a forward edge of the front wheels 16, such that it affects airflow passing between the front wheels 16. In the configuration illustrated in the figures, the static panel 22 may also act as a stiffener for, in particular, the lower bumper portion of the front fascia 14.

As discussed above, the dynamic panel 24 may be positioned in at least two fixed positions relative to the static panel 22. The example active underbody deflector 20 shown includes an actuator 30 configured to locate the dynamic panel 24 in the least two fixed positions relative to the static panel 22. Each of the positions may be described with respect to an offset angle 32 relative to the static panel 22, to the ground plane 18, or to the horizontal plane of the vehicle 10.

The actuator 30 is shown schematically and may represent numerous types of actuators. For example, and without limitation, the actuator 30 may include: a rotary motor, a solenoid, a cam link, a multi-bar linkage, hydraulics, or combinations thereof. Additionally, as discussed below, the actuator 30 may include a shock absorber or a clutch mechanism to allow retraction movement under certain loading conditions.

Several exemplary fixed positions are illustrated in FIGS. 2A, 2B, and 2C. FIG. 2A shows the stowed position, in which the dynamic panel 24 is substantially aligned—i.e., substantially parallel—with the trailing edge 28 of the static panel 22. In the example active underbody deflector 20 shown, the trailing edge 28 of the static panel 22 is substantially horizontal, relative to the ground plane 18. When the dynamic panel 24 is in the stowed position shown, the offset angle 32 is generally zero degrees. The stowed position tends to result in uninterrupted airflow at the trailing edge 28.

FIG. 2B shows the partially deployed position of the dynamic panel 24. In general, deployed positions may be considered to have an offset angle 32 of at least 15 degrees relative to the trailing edge 28 (and also relative to the stowed position). FIG. 2C shows the fully deployed position, in which the offset angle 32 of the dynamic panel 24 is substantially ninety degrees, such that the dynamic panel 24 is perpendicular to the trailing edge 28 of the static panel 22 and to ground plane 18.

Note that the three illustrative fixed positions shown in the figures are not limiting. Depending on the type of vehicle, the active underbody deflector 20 may have fewer or more positions. Additionally, in some configurations of the active underbody deflector 20 may be configured to move the dynamic panel 24 into an infinite number of positions along an available range of motion.

In some configurations of the active underbody deflector 20, the fully deployed position will set the offset angle 32 to at least seventy-five degrees relative to the stowed position. The partially deployed position of the dynamic panel 24 includes any offset angle 32 of less than the fully deployed position.

When the vehicle 10 is operating at high speeds, which may include those involved with highway driving or anything above parking speeds, the dynamic panel 24 may be actuated beyond the stowed position to the partially deployed position, the fully deployed position, or any intermediate position. When deployed, the dynamic panel 24 pushes the airflow wake away from the underside 12 and toward the ground plane 18. In some configurations, the dynamic panel 24 of the active underbody deflector 20 may begin deploying at speeds above thirty miles per hour.

By moving airflow lower, the active underbody deflector 20 reduces airflow contact with structures toward the rear of the vehicle 10, such as the rear axle, differential, and wheels, which may reduce drag and turbulence caused by those structures. Additionally, by directing airflow away from the underside 12, the active underbody deflector 20 limits incursion of airflow into exposed cavities on the underside 12. Otherwise, cavities on the underside 12 may need to be covered or closed by additional underbody panels, such that the active underbody deflector 20 may reduce the need for other closeout panels disposed rearward of the dynamic panel 24.

When the vehicle 10 is not operating at high speeds, such as during parking speeds—for example, at less than thirty miles per hour—the dynamic panel 24 may be stowed. At lower speeds, there is less drag and turbulence on the underside 12 of the vehicle 10. Therefore, the benefits of deploying the dynamic panel 24 of the active underbody deflector 20 are reduced. With the dynamic panel 24 stowed, the vehicle 10 may have more appealing aesthetics. Additionally, the actuator 30 is less likely to come into contact with debris while the dynamic panel 24 is stowed.

The active underbody deflector 20 may be configured to place the dynamic panel 24 in the stowed position even when the vehicle 10 is moving at higher speeds and would otherwise be deployed. For example, when the vehicle 10 is moving over rough road conditions or is operating off-road, the dynamic panel 24 may be stowed to prevent contact between the dynamic panel 24 and the ground or objects on the ground. There may also be weather conditions, such as deep snow, in which it would be beneficial to retract the dynamic panel 24 at highway speeds. Retraction may limit damage to the dynamic panel 24 and protection of the actuator 30.

As schematically shown in FIG. 2A, the vehicle 10 also includes an electronic controller 40 in communication with the actuator 30 for the active underbody deflector 20. The electronic controller 40 is configured to control the actuator 30 and to locate the dynamic panel 24 in any of the fixed positions. The electronic controller 40 includes sufficient computational resources, input channels, and output channels to determine the extent of deployment for the dynamic panel 24 and the command the actuator 30 to effect such deployment.

The electronic controller 40 may be a separate module, may be part of a larger computer system, such as a powertrain control module or a vehicle control module. The electronic controller 40 may also be configured to cooperate with on board diagnostic systems, such that the electronic controller 40 may diagnose and communicate operating errors of the active underbody deflector 20. For example, and without limitation, if the actuator 30 is not responding to commands or the dynamic panel 24 is stuck in one of the fixed positions, the electronic controller 40 may signal the operator or the computer of the vehicle 10.

The actuator 30 of the active underbody deflector 20 may also be configured with a recoil feature or mechanism. The actuator 30 may allow movement of the dynamic panel 24 from the deployed position toward the stowed position when the dynamic panel 24 is subjected to loads from the front of the vehicle 10 above a threshold load. However, the actuator 30 would prevent movement of the dynamic panel 24 from the deployed position toward the stowed position when the dynamic panel 24 is subjected to loads from the front of the vehicle 10 below the threshold load.

With the clutching or recoil feature, the dynamic panel 24 would be allowed to move upward toward the stowed position when it comes into contact with objects on the roadway. For example, and without limitation, tire treads or chunks of snow and ice on the roadway may come into contact with the dynamic panel 24. Instead of resisting the force applied by such objects, the actuator 30 may sense that the threshold force has been exceeded and allow the dynamic panel 24 to move, which may limit or reduce damage to the dynamic panel 24 or the actuator 30.

The recoil mechanism of the actuator 30 may include a clutch or a spring, and may be a cam and spring device with an over-center type of rocking release. Therefore, when an applied force moves the dynamic panel 24 a sufficient amount relative to the actuator 30, the over-center cam passes a rocking point and allows the dynamic panel 24 to easily retract. The actuator 30 may also electronically sense the load applied and release the actuator 30 to allow retraction in response to forces above the threshold load.

As part of its function to improve aerodynamic characteristics of the vehicle 10, the dynamic panel 24 is often subjected to wind loads while deployed. Therefore, the actuator 30, the electronic controller 40, or both, are configured to keep the dynamic panel 24 deployed against wind loads. The threshold load at which the dynamic panel 24 is allowed to recoil may be adjusted, based on the speed of the vehicle 10, to adjust for varying wind loads applied during normal operation of the active underbody deflector 20.

Figure 3:
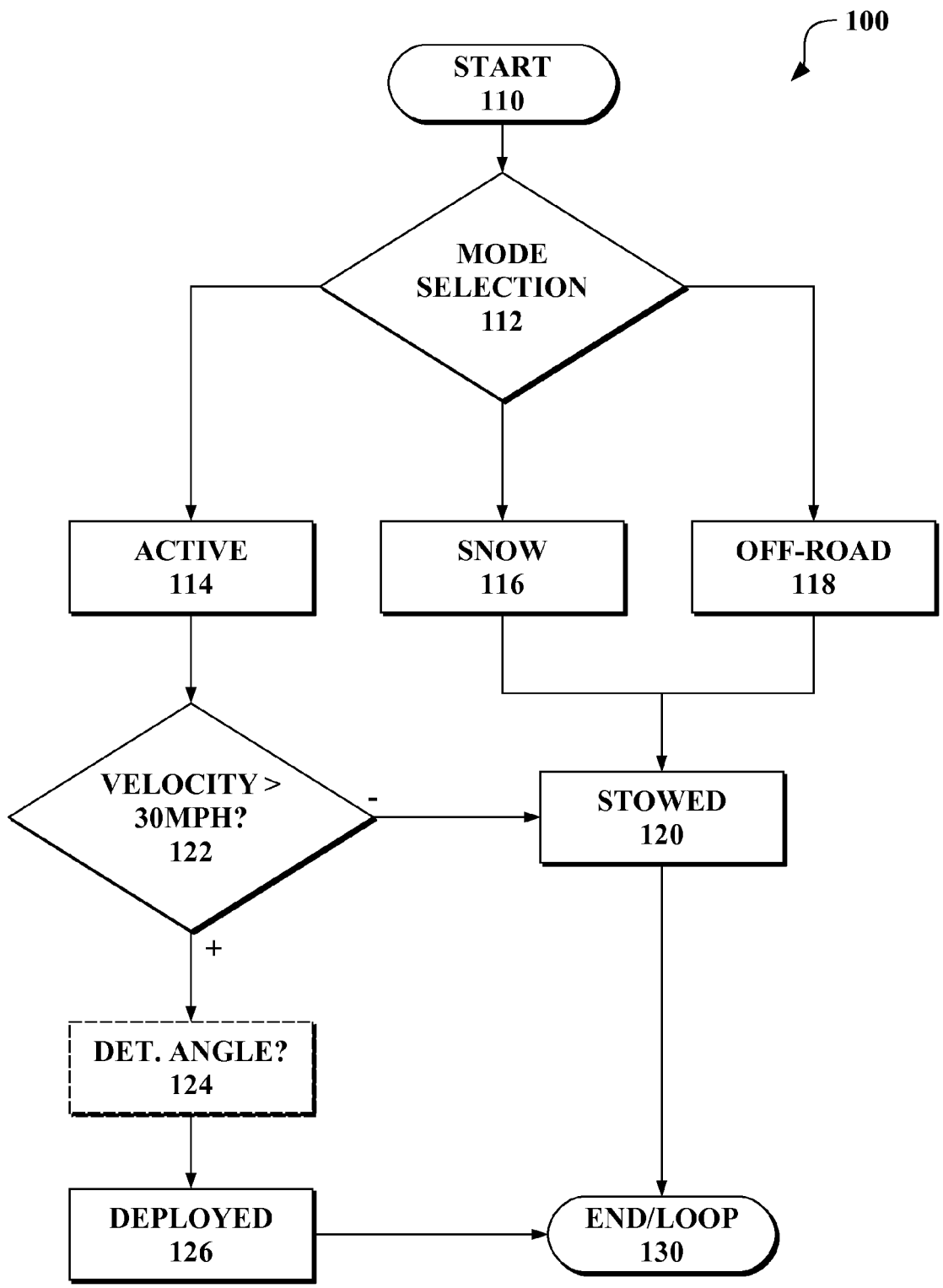
FIG. 3 is a schematic flow chart illustrating one possible control scheme for positioning an active underbody deflector.

Referring now to FIG. 3, and with continued reference to FIGS. 1-2C, there is shown a schematic flow chart of a method 100. FIG. 3 broadly illustrates one example of a control scheme for actuating or locating the dynamic panel 24 of the active underbody deflector 20. FIG. 3 shows only a high-level diagram of the method 100, and the exact order of the steps of the algorithm or method 100 shown is not required. Steps may be reordered, steps may be omitted, and additional steps may be included. Furthermore, the method 100 may be a portion or sub-routine of another algorithm or method.

For illustrative purposes, the method 100 may be described with reference to the elements and components shown and described in relation to the other figures and may be executed by the electronic controller 40. However, other components may be used to practice the method 100 and the systems defined in the appended claims. Any of the steps may be executed by multiple controls or control system components.

Step 110: Start/Initialize.

The method 100 may begin at a start or initialization step, during which time the method 100 is made active and may be monitoring, for example and without limitation: operating conditions of the vehicle 10, ambient conditions, driver inputs, or inputs from other systems. Initiation may occur, for example, in response to the vehicle operator inserting the ignition key or in response to specific conditions being met, such as the transmission of the vehicle 10 being change from parking modes to driving modes. The method 100 may be running constantly or looping constantly whenever the vehicle is in use.

Step 112: Selection or Determination of Mode.

The method 100 determines the operating mode for the active underbody deflector 20. In particular, the method 100 may determine whether conditions are suitable for a mode that deploys the dynamic panel 24. In the example control method 100 illustrated, there are three modes: two in which deployment of the dynamic panel 24 is restricted and one in which deployment of the dynamic panel 24 is allowed.

Step 114: Active Mode.

If the method 100 determines that conditions would allow for deployment of the dynamic panel 24 at suitable speeds, then the method 100 proceeds to the active mode at step 114. The active mode may also be considered the default mode, such that it is selected unless there are countervailing reasons that prevent the active mode.

Step 116: Snow and Ice Mode.

The method 100 may select a snow and ice mode and proceed to step 116. This mode recognizes that the existence of snow, ice, or combinations thereof may come into contact with the dynamic panel 24 if it were deployed.

Step 118: Off-Road Mode.

The method 100 may also select an off-road mode and proceed to step 118. This mode recognizes that when the vehicle 10 is taken off of normal, smooth roads, dirt, rocks, plants, or other objects may come into contact with the dynamic panel 24 if it were deployed. The snow and ice mode and the off-road mode may alternatively be referred to as non-active modes.

The snow and ice mode or the off-road mode may be selected or determined in various ways by the method 100. For example, there may be a driver input device, such as a button or click wheel that allows the operator of the vehicle 10 to alert the electronic controller 40 to planned off-road driving or to the existence of inclement weather. The method 100 may also include monitoring of ambient conditions to determine when inclement weather is likely or may include communication with weather reporting services.

Additionally, other triggers for the non-active modes may be used. For example, the method 100 may monitor for selection of powertrain modes—such as four-by-four or four-low mode selections—that suggest either off-road driving or inclement weather conditions.

Step 120: Stowed Dynamic Panel.

When either of the non-active modes is selected, the method 100 stows the dynamic panel 24 of the active underbody deflector 20. This occurs regardless of the operating velocity of the vehicle 10, and is generally implemented to protect the dynamic panel 24 and the actuator 30 from damage in the event of contact with an object that may, otherwise, cause damage. Note that the stowed position may have an offset angle 32 of between negative five and five degrees relative to the trailing edge 28 of the fixed panel 22.

Step 122: Determine Whether Velocity is Above Threshold Level.

When the active mode is selected, the method 100 next determines whether the vehicle 10 is moving at a speed or velocity above a threshold level, such as (in the example shown) thirty miles per hour. If the velocity is not above the threshold, the method 100 proceeds to step 120 and stows, or maintains the stowed position of, the dynamic panel 24.

Optional Step 124: Determine Angle.

When the vehicle 10 is operating at a velocity above the threshold, the method 100 will deploy the dynamic panel 24. In some configurations, the active underbody deflector 20 will only utilize two positions for the dynamic panel 24: the stowed position illustrated in FIG. 2A and the fully deployed position illustrated in FIG. 2C. However, in other configurations, there may be multiple deployment positions. Therefore, the method 100 may determine the preferred offset angle 32 for the dynamic panel 24.

Step 126: Deploy Dynamic Panel.

The method 100 then effects deployment of the dynamic panel 24. This may occur by signaling the electronic controller 40 with the selected offset angle 32, if that component was not executing the method 100. Two illustrative examples of deployed positions of the dynamic panel 24 that may be selected by the method 100 are a partially deployed position and a fully deployed position.

The partially deployed position may be actuated to an offset angle 32 of between thirty and sixty degrees. The fully deployed position may be actuated to an offset angle 32 between eighty-five and ninety-five degrees. Some configurations may utilize the deployments of greater than ninety degrees during high speed braking, such that there may be an additional deployment state.

Step 130: End/Loop.

After setting the dynamic panel 24 to the determined offset angle 32, the method 100 may end, loop, or repeat. In many implementations, the method 100 will be constantly looping to verify the operating conditions of the vehicle 10 and to select the preferred offset angle 32 for the dynamic panel 24. In other configurations, the method 100 will hold the dynamic panel 24 at a selected position until some event occurs.

The detailed description and the drawings or figures are supportive and descriptive of the subject matter discussed herein. While some of the best modes and other embodiments for have been described in detail, various alternative designs, configurations, and embodiments exist.

The invention claimed is:

1. An active aerodynamic feature for an underside of a vehicle, comprising:
    a static panel having a leading edge attached to a front fascia of the vehicle and a trailing edge distal from the front fascia;
    a dynamic panel movably attached to the trailing edge of the static panel; and
    an actuator configured to locate the dynamic panel in at least two fixed positions relative to the static panel, wherein the fixed positions include:
    a stowed position, substantially aligned with the trailing edge of the static panel; and
    a deployed position, at an offset angle relative to the trailing edge of the static panel and to the stowed position.

2. The active aerodynamic feature of claim 1, wherein the actuator is configured to:
    prevent movement of the dynamic panel from the deployed position toward the stowed position when the dynamic panel is subjected to loads from the front of the vehicle below a threshold load, and
    allow movement of the dynamic panel from the deployed position toward the stowed position when the dynamic panel is subjected to loads from the front of the vehicle above the threshold load.

3. The active aerodynamic feature of claim 2, wherein the trailing edge of the static panel is substantially horizontal, relative to a ground plane of the vehicle.

4. The active aerodynamic feature of claim 3, further comprising:
    an electronic controller in communication with the actuator and configured to control the actuator to locate the dynamic panel.

5. The active aerodynamic feature of claim 4, wherein the deployed position of the dynamic panel is a fully deployed position, which is offset angles at least 75 degrees relative to the stowed position, and wherein the fixed positions of the dynamic panel further include a partially deployed position having an offset angle less than the fully deployed position.

6. The active aerodynamic feature of claim 5, wherein the offset angles of the fixed positions of the dynamic panel, relative to the trailing edge of the static panel, are:
    between negative five and five degrees at the stowed position;
    between thirty and sixty degrees at the partially deployed position; and
    between eighty-five and ninety-five degrees at the fully deployed position.

7. The active aerodynamic feature of claim 1, further comprising:
    an electronic controller in communication with the actuator and configured to control the actuator to locate the dynamic panel.

8. The active aerodynamic feature of claim 1, wherein the deployed position of the dynamic panel is a fully deployed position, the fixed positions of the dynamic panel further include a partially deployed position, and the offset angles of the fixed positions of the dynamic panel, relative to the trailing edge of the static panel, are:
    between negative five and five degrees for the stowed position;
    between thirty and sixty degrees for the partially deployed position; and
    between eighty-five and ninety-five degrees for the fully deployed position.

9. A vehicle, comprising:
    a front fascia;
    a underbody extending rearward from the front fascia; and
    an active aerodynamic feature forming a portion of the underside, and including:
    a static panel having a leading edge attached to a front fascia of the vehicle and a trailing edge distal from the front fascia;
    a dynamic panel movably attached to the trailing edge of the static panel; and
    an actuator configured to locate the dynamic panel in at least two fixed positions relative to the static panel, wherein the fixed positions include a stowed position, substantially aligned with the trailing edge of the static panel, and a deployed position, at an offset angle relative to the trailing edge of the static panel and to the stowed position.

10. The vehicle of claim 9, wherein the offset angle of the dynamic panel in the deployed position is greater than eighty degrees relative to the stowed position of the dynamic panel.

* * * * *